United States Patent
Takatani et al.

(10) Patent No.: US 8,364,206 B2
(45) Date of Patent: Jan. 29, 2013

(54) BASE STATION APPARATUS AND INTERFERENCE REDUCING METHOD

(75) Inventors: Kenjiro Takatani, Yokohama (JP); Kenichi Yagisawa, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 414 days.

(21) Appl. No.: 12/814,233

(22) Filed: Jun. 11, 2010

(65) Prior Publication Data
US 2010/0317292 A1 Dec. 16, 2010

(30) Foreign Application Priority Data

Jun. 12, 2009 (JP) ................................. 2009-140755

(51) Int. Cl.
*H04M 1/00* (2006.01)
(52) U.S. Cl. ..................... 455/562.1; 455/561; 455/522; 455/67.13; 455/446; 455/501; 342/367
(58) Field of Classification Search ................... 455/522, 455/562.1, 67.13, 561, 422.1, 446, 501; 342/367
See application file for complete search history.

(56) References Cited

U.S. PATENT DOCUMENTS

| | | | | |
|---|---|---|---|---|
| 7,218,955 | B2 * | 5/2007 | Aoyama et al. | 455/562.1 |
| 7,890,130 | B2 * | 2/2011 | Sung et al. | 455/522 |
| 2005/0250542 | A1 * | 11/2005 | Aoyama et al. | 455/562.1 |
| 2008/0057934 | A1 * | 3/2008 | Sung et al. | 455/422.1 |
| 2009/0042579 | A1 * | 2/2009 | Kitajima | 455/446 |

FOREIGN PATENT DOCUMENTS

| | | |
|---|---|---|
| JP | 2009-021787 | 7/2007 |
| JP | 2008-061250 | 8/2007 |
| JP | 2009-044397 | 8/2007 |

OTHER PUBLICATIONS 6.3.2 Radio Resource Control Information Elements; Release 8, 3GPP TS 36.331 V8.5.0 (Mar. 2009); pp. 113-134.
4.2 Fractional Frequency Reuse; (MBS); WiMAX Forum; 2006, pp. 27-29.
IEEE 802.16m-08/003r7; Feb. 7, 2009; pp. 155-159.
IEEE 802.16m-08/003r7; Feb. 7, 2009; pp. 161-162.

* cited by examiner

*Primary Examiner* — April G Gonzales
(74) *Attorney, Agent, or Firm* — Foley & Lardner LLP

(57) ABSTRACT

A base station has a first antenna for emitting radio waves at a first tilt angle and a second antenna for emitting radio waves at a second tilt angle different from the first tilt angle. If the antennas have different propagation lengths, a transmission diversity gain is not obtained and interference occurs in an adjacent area. In such a case, when one antenna having a shorter propagation length, which means less interference in the adjacent area, is used for transmission, the throughput of each terminal is increased at the area. For example, a controller changes two antenna transmission to one antenna transmission when the difference between the reception qualities of signals sent from the base station and an adjacent base station adjacent to the base station is smaller than a predetermined reference, the reception qualities being measured at the terminal.

11 Claims, 15 Drawing Sheets

BASE STATION APPARATUS AND INTERFERENCE REDUCING METHOD

CLAIM OF PRIORITY

The present application claims priority from Japanese patent application JP 2009-140755 filed on Jun. 12, 2009, the content of which is hereby incorporated by reference into this application.

BACKGROUND OF THE INVENTION

1. Field of the Invention

The present invention relates to mobile radio communication technologies, and more particularly, to a technology for reducing interference between frequencies close to each other at a cell boundary or a sector boundary of a base station having a plurality of transmission antennas in a mobile radio communication system employing the orthogonal frequency division multiple access (OFDMA) method.

2. Description of the Related Art

A mobile radio communication system is formed of a plurality of base station apparatuses and a plurality of mobile terminals (or radio terminals) communicating in radio with the plurality of base station apparatuses. The plurality of base station apparatuses are disposed separately. Each of the plurality of base station apparatuses has an area called a cell where radio communication is possible in a range where radio waves sent from the apparatus reaches. In some cases, each base station apparatus has a plurality of radio wave reaching zones called sectors made by dividing the cell when using a directional antenna. In general, the cell is divided into three sectors or six sectors. Each sector can be regarded as a cell made by dividing a space by the angle determined by the directivity of the antenna used. In the following description, cells and sectors may be collectively called cells.

The radio communication system has a mechanism for maintaining communication by successive handover among the base station apparatuses as a mobile terminal moves. To allow this handover, the cells formed by the plurality of base station apparatuses overlap. When a mobile terminal communicates in radio with a base station apparatus in an overlapped region, the communication causes interference at another base station apparatus which includes the region in its cell. Interference is a disturbance in communication performed by another mobile terminal and causes a reduction in signal quality in radio communication and a reduction in throughput.

Technologies for avoiding or controlling inter-cell interference include those disclosed in Japanese Unexamined Patent Application Publications No. 2008-61250, No. 2009-21787, and No. 2009-44397.

In standardization activities, the Third Generation Partnership Project (3GPP), which is one of standardization groups, has proposed a radio method called long term evolution (LTE), which is based on orthogonal frequency division multiplexing (OFDM). A technology for changing the antenna transmission mode of a terminal by an instruction from a base station in LTE is disclosed in 6.3.2 Radio resource control information elements, TS 36.331, 3GPP.

Another standardization group has proposed a radio method called mobile worldwide interoperability for microwave access (Mobile WiMAX), which is based on OFDM, in IEEE 802.16e. A technology called fractional frequency reuse (FFR) is described in Section 4.2 Fractional Frequency Reuse, Part I A Technical Overview Performance Evaluation, Mobile WiMAX.

FFR is also discussed in Section 20.1 Interference Mitigation Using Fractional Frequency Reuse, 08/003r6 System Description Document, IEEE 802.16m. Network multiple input multiple output (MIMO), where a plurality of base stations cooperate, is described in another section of the same document, Section 20.2.2 Multi-ABS joint Antenna Processing, 08/003r6 System Description Document, IEEE 802.16m.

SUMMARY OF THE INVENTION

The above-described patent application publications and technical documents disclose technologies for reducing or controlling interference in cell boundary regions where a plurality of cells overlap. These technologies are based on the assumption that the plurality of transmission antennas provided for a base station have the same radio wave reaching range. In actual operation, however, when an antenna is shared by a plurality of systems, the same radio wave reaching range cannot be specified in some cases. If radio waves sent from a plurality of antennas are unevenly blocked by buildings or other structures, the radio wave reaching ranges may differ. In a region where the transmission antenna mode cannot be set to MIMO, the base station conventionally uses transmission diversity to obtain the radio wave propagation gain at the position of a terminal. If a plurality of antennas have uneven radio wave reaching ranges, as described above, the expected transmission diversity gain is not obtained. In addition, an antenna having a wide radio wave reaching range causes strong interference in adjacent cells.

In view of above, an object of the present invention is to control inter-cell interference according to the state and position of each radio terminal.

Another object of the present invention is, when a plurality of transmission antennas provided for a base station apparatus have different radio wave reaching regions, to reduce interference in adjacent cells while the signal-to-noise ratio (SNR) at the position of a terminal is maintained at a value close to that obtained when transmission diversity is applied. Another object of the present invention is to increase the throughput of all terminals disposed in the area where the terminals are located.

If a plurality of antennas have different propagation lengths, the transmission diversity gain is not obtained and interference occurs in an adjacent area. In that case, the throughput of each terminal in the area where the terminal is located is increased when one transmission antenna having a shorter propagation length, which means less interference in the adjacent area, is used although the transmission diversity gain is not obtained.

For example, in a radio communication system in which each base station apparatus has a plurality of transmission antennas and FFR is used, if the plurality of antennas cannot be set to have a tilt angle within a predetermined range or to have a gain within a predetermined range, when transmission is performed only with an antenna having a shorter propagation length in a zone around a boundary with an adjacent base station apparatus, interference with the adjacent base station apparatus is reduced.

For example, there are three transmission methods using a plurality of transmission antennas: MIMO is used to effectively use the radio resources in an area where an FFR reuse carrier is assigned; transmission diversity is used to obtain the gain when the antenna tilt angles and gains are within predetermined ranges in an area where an independent carrier is assigned; and one antenna is used for transmission to narrow the interference region when the antenna tilt angles and gains exceed the predetermined ranges in an area where an independent carrier is assigned.

According to the first solving means of this invention, there is provided a base station apparatus comprising: a first antenna for emitting radio waves at a first tilt angle; a second antenna for emitting radio waves at a second tilt angle different from the first tilt angle; a radio unit for sending and receiving radio signals through the first and second antennas; and a baseband unit for sending and receiving signals to and from a terminal through the first antenna and/or the second antenna by switching between a first mode in which a signal is sent to the terminal with one of the first antenna and the second antenna and a second mode in which the signal is sent to the terminal with a plurality of antennas that include the first antenna and the second antenna;

wherein the signal is sent in the first mode when a difference between reception quality of the signal sent from the base station apparatus and reception quality of the signal sent from an adjacent base station apparatus adjacent to the base station apparatus is smaller than a predetermined reference, each reception quality being measured at the terminal; and the signal is sent in the second mode when the difference between the reception quality of the signal sent from the base station apparatus and the reception quality of the signal sent from the adjacent base station apparatus adjacent to the base station apparatus is equal to or larger than the predetermined reference, each reception quality being measured by the terminal.

According to the second solving means of this invention, there is provided an interference reducing method for a base station apparatus that includes a first antenna for emitting radio waves at a first tilt angle and a second antenna for emitting radio waves at a second tilt angle different from the first tilt angle, the interference reducing method switching between a first mode in which a signal is sent to a terminal with one of the first antenna and the second antenna and a second mode in which the signal is sent to the terminal with a plurality of antennas that include the first antenna and the second antenna to reduce interference in a cell adjacent to the cell of the base station apparatus, the interference reducing method comprising the steps of:

requesting, by the base station apparatus, the terminal to measure reception quality of the signal sent from the base station apparatus and reception quality of the signal sent from an adjacent base station apparatus adjacent to the base station apparatus;

measuring, by the terminal, the reception quality of the signal sent from the base station apparatus and the reception quality of the signal sent from the adjacent base station apparatus;

when the difference between the reception quality of the signal sent from the base station apparatus and the reception quality of the signal sent from the adjacent base station apparatus is smaller than a predetermined reference, each reception quality being measured at the terminal, changing, by the base station apparatus operating in the second mode to transmit the signal, the second mode to the first mode; and when the difference between the reception quality of the signal sent from the base station apparatus and the reception quality of the signal sent from the adjacent base station apparatus is equal to or larger than the predetermined reference, each reception quality being measured at the terminal, changing, by the base station apparatus operating in the first mode to transmit the signal, the first mode to the second mode.

According to the present invention, it is possible to control inter-cell interference according to the state and position of each radio terminal.

According to the present invention, it is possible, when a plurality of transmission antennas provided for a base station apparatus have different radio wave reaching regions, to reduce interference in adjacent cells while the signal-to-noise ratio (SNR) at the position of a terminal is maintained at a value close to that obtained when transmission diversity is applied. According to the present invention, it is possible to increase the throughput of all terminals disposed in the area where the terminals are located.

DESCRIPTION OF THE PREFERRED EMBODIMENTS

Figure 1:
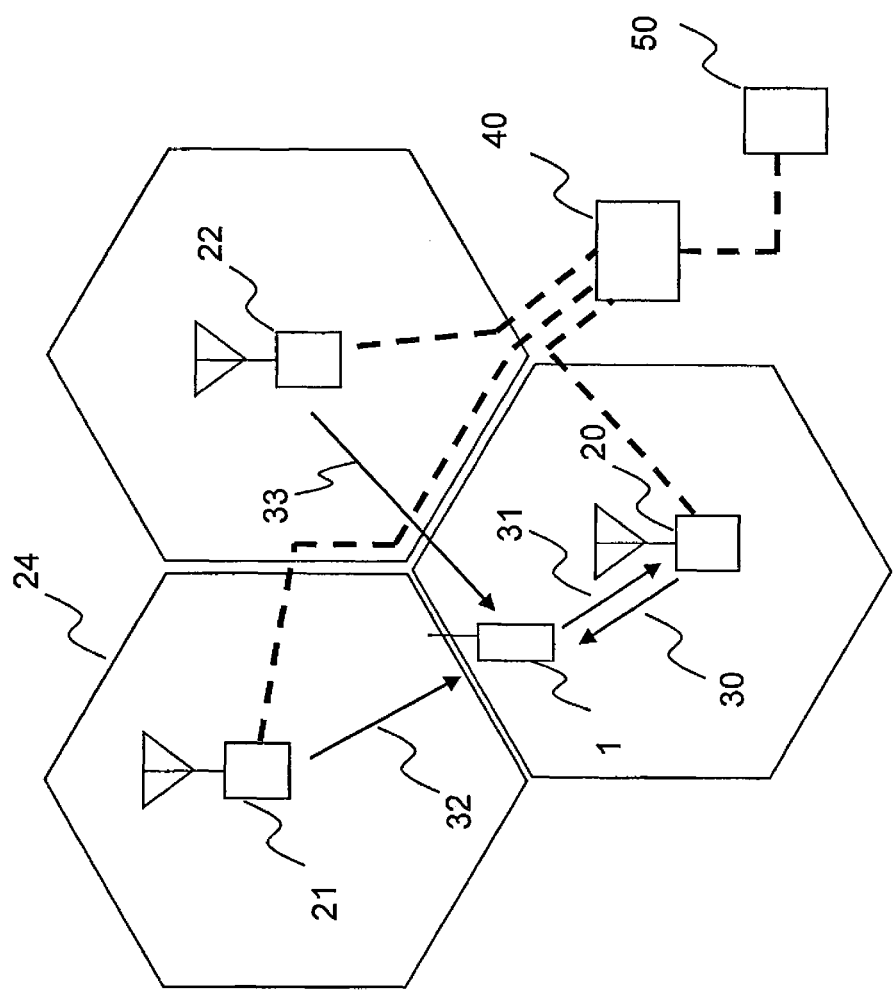
FIG. 1 is a view showing an example structure of a mobile communication system to which the present invention is applied.

FIG. 1 is a view showing an example structure of a mobile communication system (or a radio communication system). Base station apparatuses (hereinafter called just base stations sometimes) 20 to 22 communicate with a core apparatus 50 to connect to a core network through the core apparatus 50. A signal sent from the core apparatus 50 is input to the base station apparatus 20 through a switch 40. The base station apparatus 20 converts the signal sent from the core apparatus to a high frequency signal and sends it to a mobile terminal (or a radio terminal) 1 by a radio signal 30. The mobile terminal 1 receives the radio signal 30 sent from the base station apparatus 20 and performs signal processing to convert the radio signal 30 to information, thereby communicating with the core apparatus 50.

The mobile terminal 1 converts information generated therein to a high frequency signal and sends it to the base station apparatus 20 by a radio signal 31. The radio signal sent from the mobile terminal 1 is received by the base station apparatus 20, is converted to the information by signal processing inside the base station apparatus 20, and is sent to the core apparatus 50 through the switch 40. Each of the plurality of base station apparatuses 20 to 22 connects to the core apparatus 50 through the switch 40 and transmits and receives signals thereto and therefrom.

As shown in FIG. 1, it is assumed here that the mobile terminal 1 is disposed at a position around the boundaries of the base station apparatus 20 and the base station apparatuses 21 and 22 adjacent to the base station apparatus 20. In such a condition, the radio signal 30, sent from the base station apparatus 20 toward the mobile terminal 1, interferes with radio signals 32 and 33 sent from the base station apparatuses 21 and 22. The mobile terminal 1 receives the interference waves 32 and 33. The interference waves 32 and 33 serve as disturbance waves when the expected waves 30, sent from the base station apparatuses 20 toward the mobile terminal 1, is received. In other words, since a radio signal necessary for communication of a mobile terminal serves as a disturbance wave for another mobile terminal, it is necessary to reduce the influence of the signal as much as possible.

FFR is known as a method for reducing interference at a cell boundary. In this technology, a plurality of adjacent base station apparatuses split frequency resources among them and weigh transmission power to reduce interference at a predetermined frequency band, thereby increasing the throughput.

Figure 5:
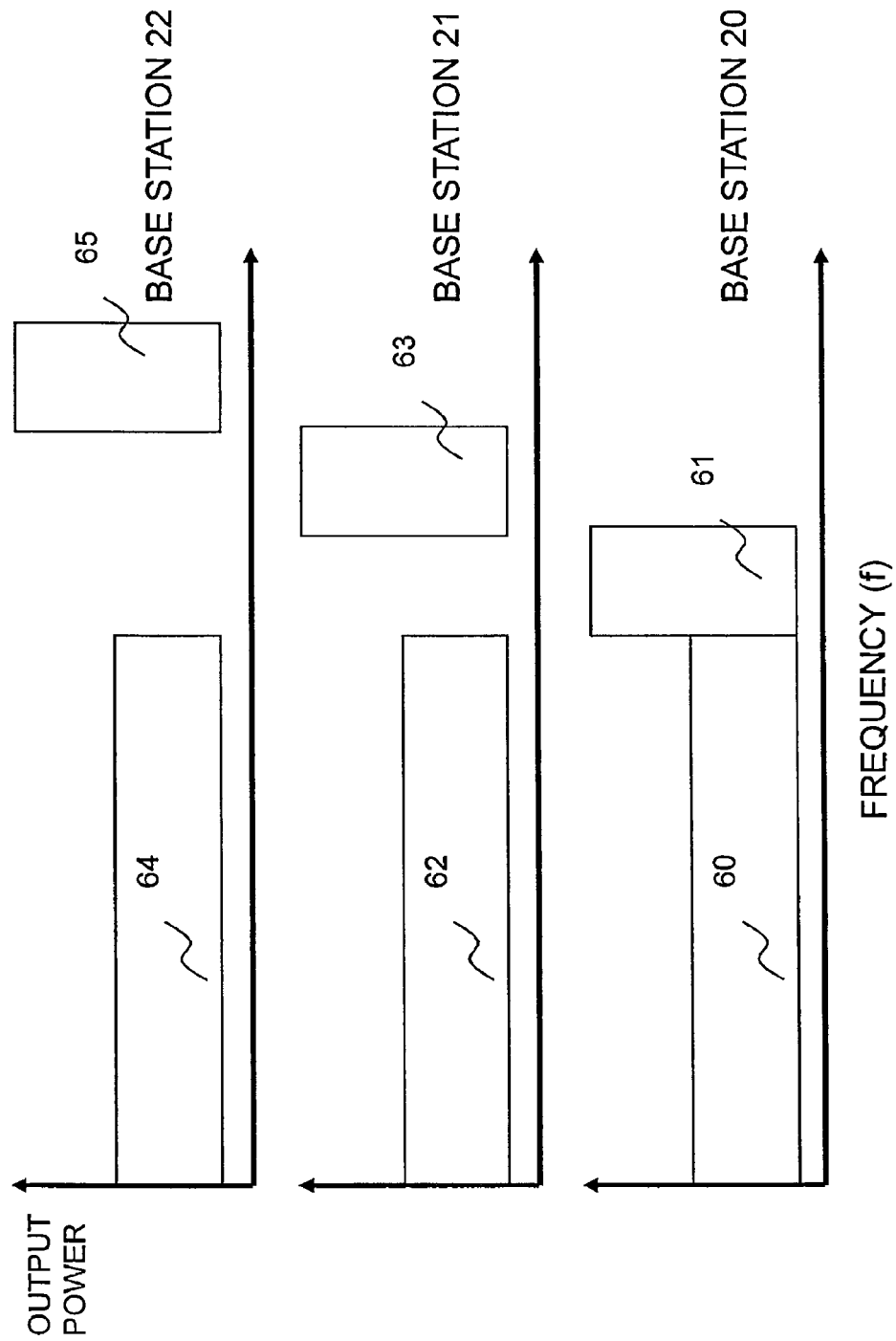
FIG. 5 is a view showing an example assignment of radio resources to a plurality of base station apparatuses when FFR is used.

FIG. 5 is a view showing an example assignment of radio resources to a plurality of base station apparatuses when FFR is used.

In FIG. 5, the horizontal axis indicates the frequency (f) and the vertical stages indicate the frequency bands (or output power) where the three adjacent base station apparatuses 20, 21, and 22 send signals. In FFR, each base station apparatus uses different frequency bands for transmission, as shown in FIG. 5, to reduce interference with the other base station apparatuses. The adjacent base station apparatuses 20, 21, and 22 perform transmission at the same frequency in predetermined frequency bands 60, 62, and 64. Since the adjacent base station apparatuses use exactly the same frequency, the frequency repeated use rate is 1. This is called reuse 1 (frequency repetition 1). To reduce interference with the other base station apparatuses, the output power is low and the radio wave reaching region is small.

The adjacent base station apparatuses 20, 21, and 22 also perform transmission at different frequencies in predetermined frequency bands 61, 63, and 65. In this case, since completely different frequencies are used by adjacent base station apparatuses and the same frequency use method is employed by the next adjacent base station apparatuses, the frequency repeated use rate is 3. This is called reuse 3 (frequency repetition 3). Because different frequencies are used among the base station apparatuses, interference is reduced even if the output power is increased and the radio wave reaching region is made large.

Figure 6:
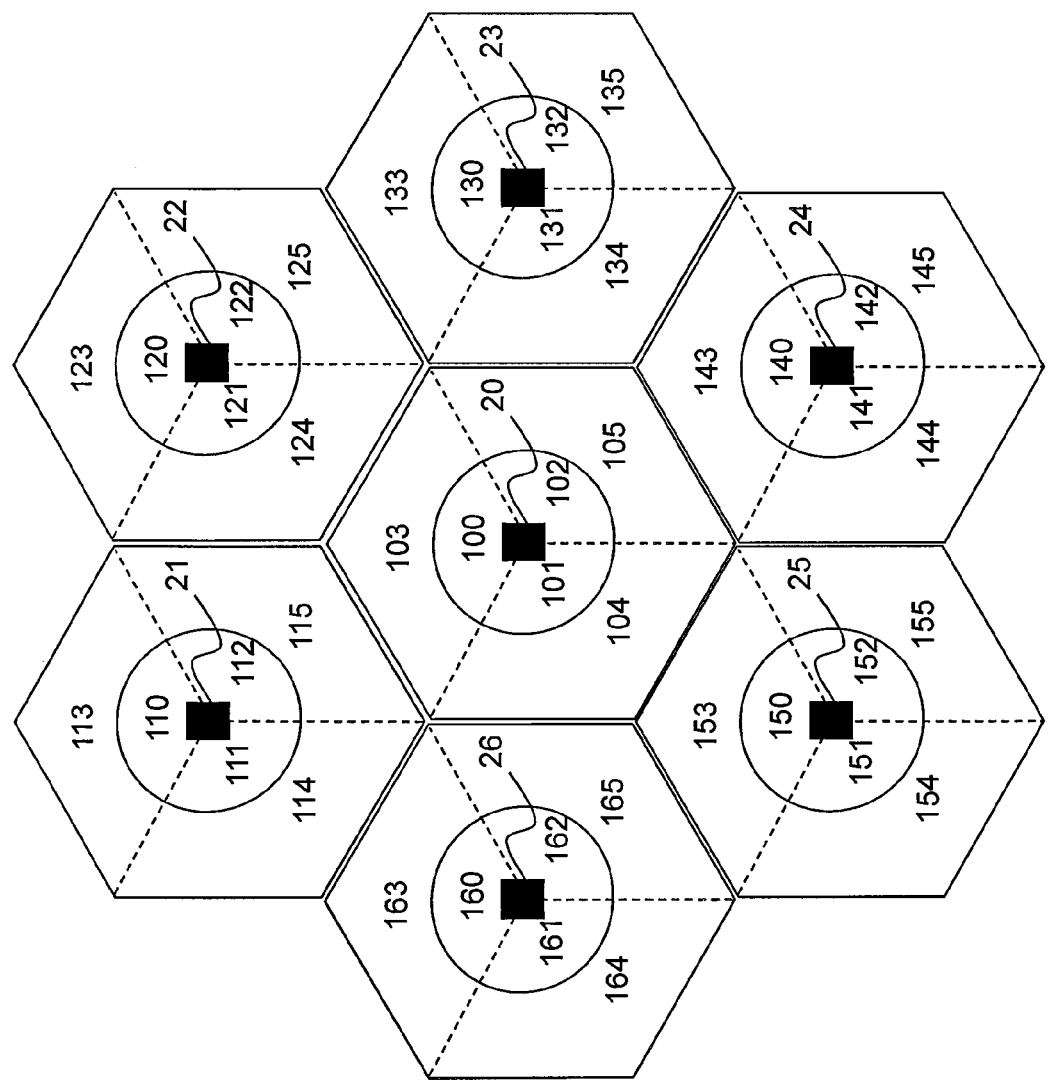
FIG. 6 is a view showing spatially the frequency assignment to a plurality of base station apparatuses when FFR is used.

FIG. 6 is a view showing spatially the frequency assignment to a plurality of base station apparatuses when FFR is used.

In FIG. 6, seven base station apparatuses 20 to 26 are disposed. Each base station apparatus has three sectors and each sector covers a fan-like area extending from the center base station apparatus. A sector is made by dividing a space by the angle determined by the directivity of the antenna used, and is sometimes called a cell.

The base station apparatus 20 located at the center in FIG. 6 will be described. The sectors are divided into two parts: central areas 100, 101, and 102 closer to the base station apparatus 20 and boundary areas 103, 104, and 105 closer to cell boundaries. In the central areas, the frequency bands 60, 62, and 64, utilized in reuse 1, are used. In the boundary areas, the frequency bands 61, 63, and 65 are assigned so as not to cause interfere in adjacent cells, reducing interference caused by adjacent base station apparatuses. This frequency use pattern is also used in adjacent other base station apparatuses, reducing interference in the whole system. In other words, in FIG. 6, boundary areas having reference numbers 1XN (X is an integer ranging from 0 to 6 and N is an integer ranging from 3 to 5) are assigned the same frequency band when N is the same integer to implement reuse 3, and the central areas having reference numbers 1XN (X is an integer ranging from 0 to 6 and N is an integer ranging from 0 to 2) are assigned the same frequency band with a low transmission power to implement reuse 1. With this configuration, FFR can be applied to a mobile radio system having three sectors.

Figure 2:
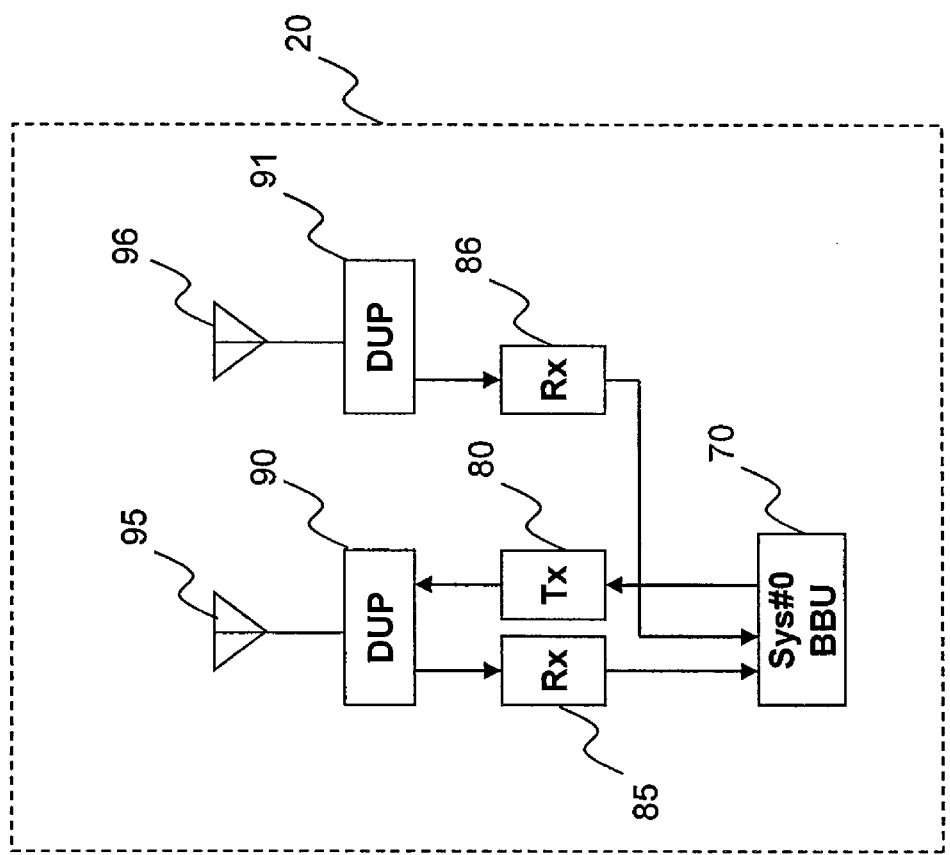
FIG. 2 is a block diagram of a base station in a system having one transmission antenna.
Figure 3:
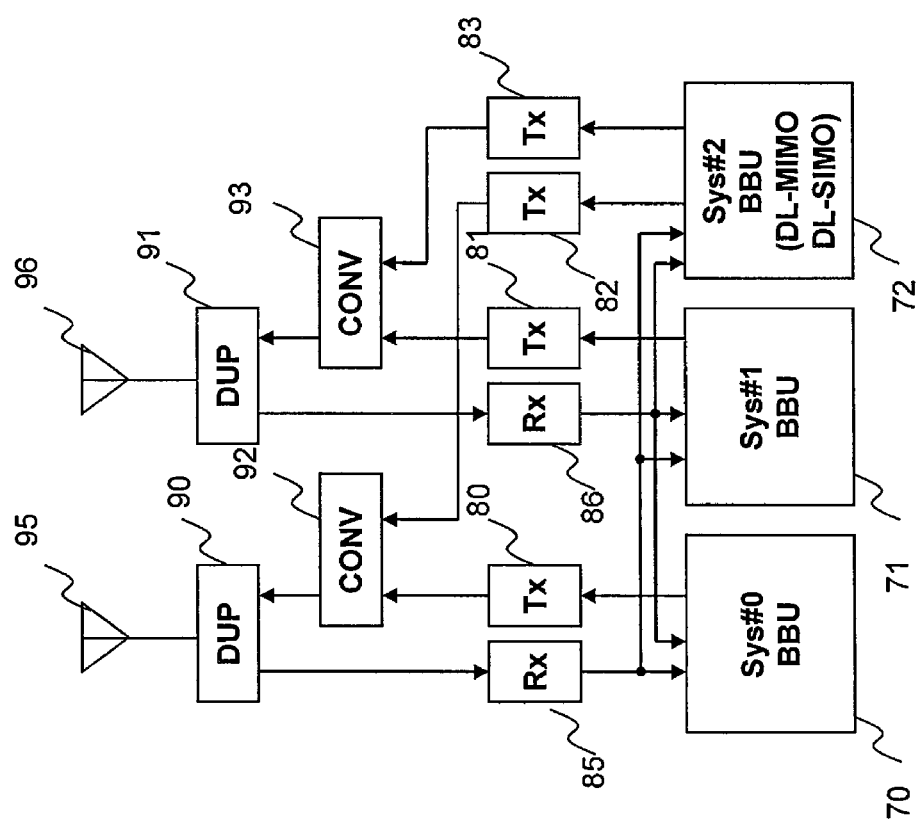
FIG. 3 is a block diagram of a base station used when systems each having one transmission antenna and a system having two transmission antennas share the antennas.

FIG. 2 is a block diagram of a base station apparatus in a system having one transmission antenna. FIG. 3 is a block diagram of a base station apparatus according to an embodiment of the present invention when systems each having one transmission antenna and a system having two transmission antennas share the antennas.

In FIG. 2, a base station apparatus 20 receives signals from a mobile terminal 1 through two antennas 95 and 96 and receivers Rx 85 and 86. The base station apparatus 20 sends a signal to the mobile terminal 1 through a transmitter Tx 80 and the antenna 95.

In FIG. 3, a base station apparatus 20 has two antennas 95 and 96 shared by three systems. A first system uses the antenna 95 as a transmission antenna and the antennas 95 and 96 as receiving antennas, and is the same as the system shown in FIG. 2. The first system includes a baseband unit (second baseband unit) 70. A second system uses the antenna 96 as a transmission antenna and the antennas 95 and 96 as receiving antennas. The second system includes a baseband unit (third baseband unit) 71.

A third system uses the antennas 95 and 96 as transmission antennas and also as receiving antennas, and is, for example, a system using MIMO. The third system includes a baseband unit (baseband unit) 72.

The antenna 95 sends radio waves, for example, at a first tilt angle as instructed by the first system. The antenna 95 sends radio waves, for example, to the radio wave reaching regions 103, 104, and 105, and others in the frequency bands 61, 63, and 65. The antenna 96 sends radio waves, for example, at a second tilt angle as instructed by the second system. The antenna 96 sends radio waves, for example, to the radio wave reaching regions 100, 101, and 102, and others in the frequency bands 60, 62, and 64.

Usually in MIMO, a plurality of antennas have the same tilt angle. In the configuration shown in FIG. 3, the antennas 95 and 96 have different tilt angles, and the third system uses the antennas, having the different tilt angles, to perform communication in MIMO or the like. In the present embodiment, the two antennas are used. Three or more antennas can also be used.

Figure 4:
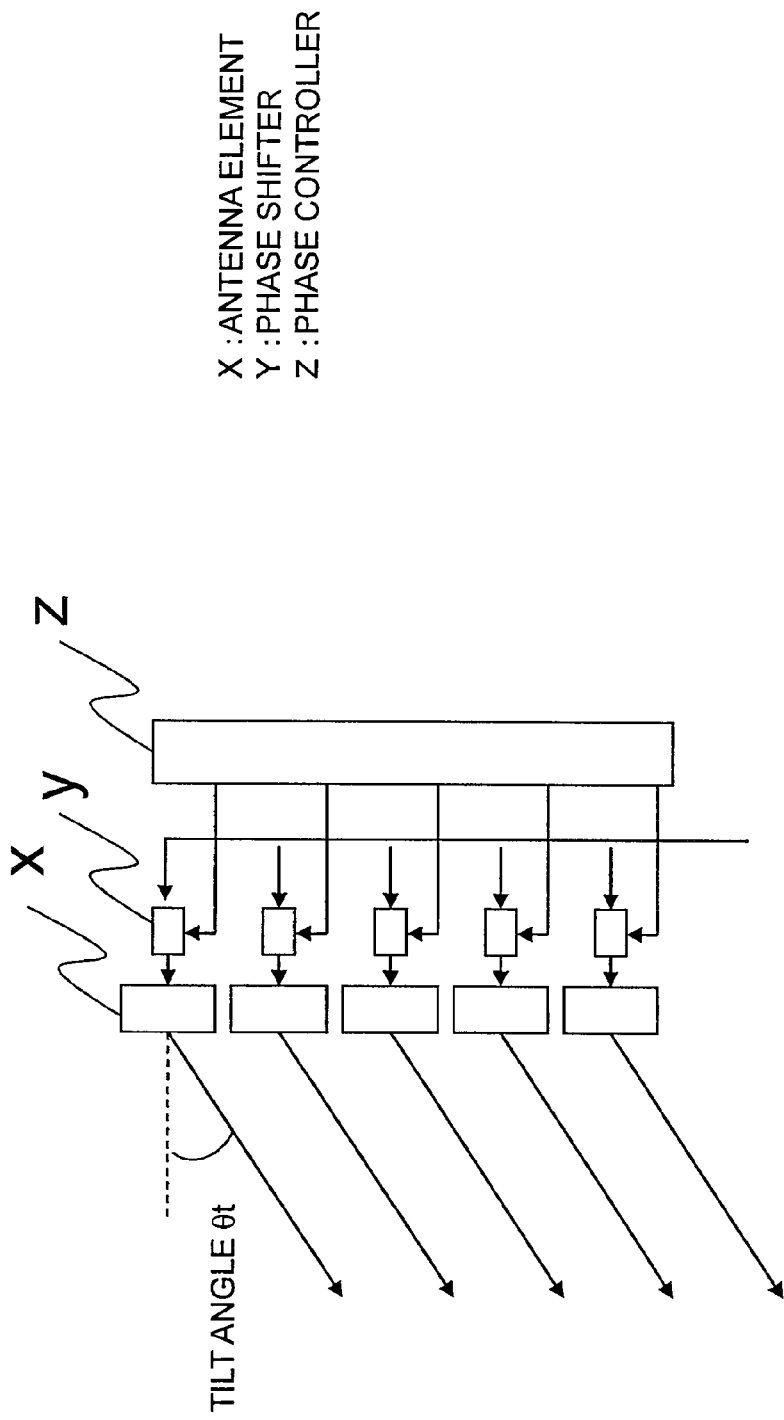
FIG. 4 is a view showing the tilt angle of a transmission antenna.

FIG. 4 shows the tilt angle of a transmission antenna. In FIG. 4, X indicates an antenna element, Y indicates a phase shifter, and Z indicates a phase controller. The phase shifter Y gives a phase shift to an input signal to change the output beam direction.

The relative phase difference Ψ (rad) can be obtained from the following expression $$\Psi = 2\pi d/\lambda \sin\theta t \quad (1)$$

where d indicates the antenna element interval and θt indicates the tilt angle.

Figure 13:
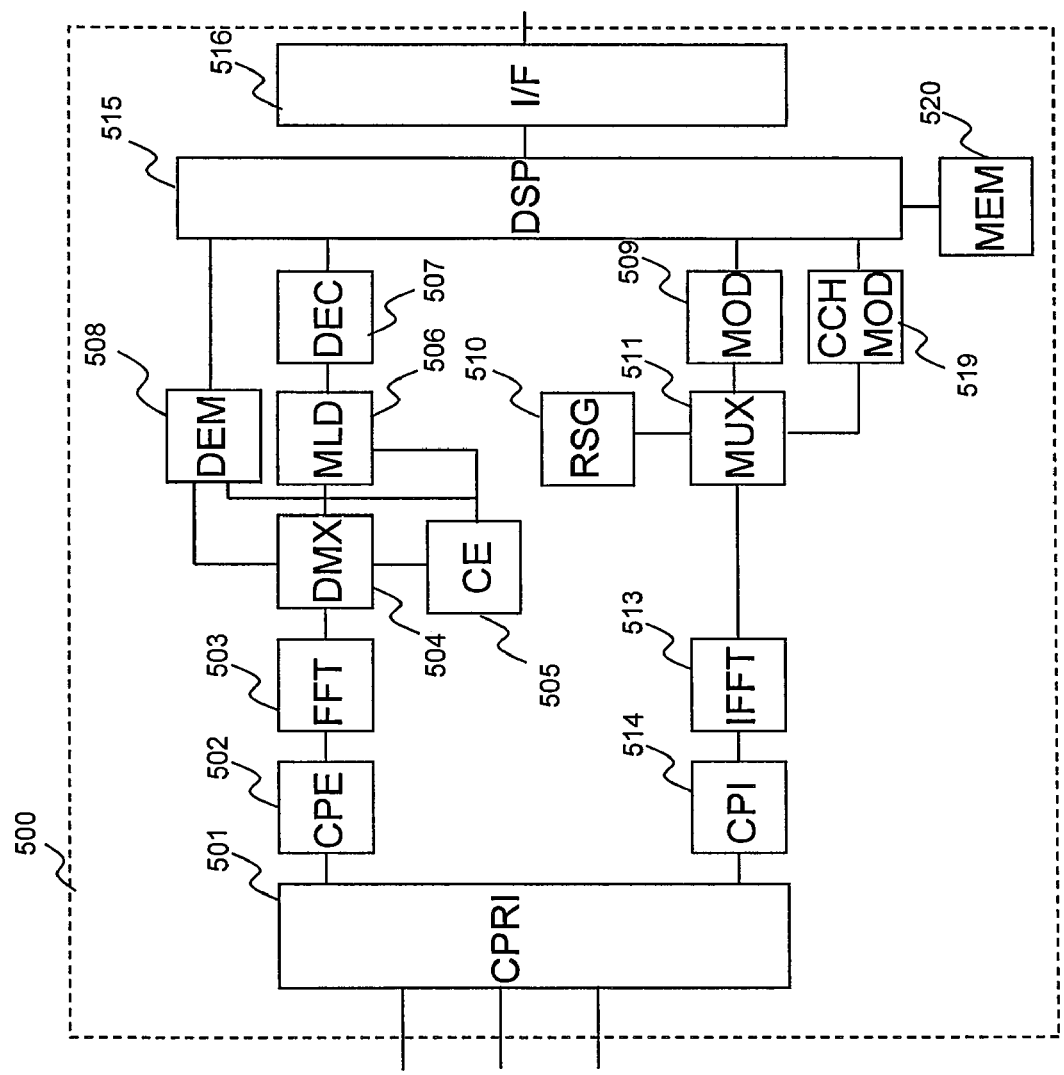
FIG. 13 shows the structure of a baseband unit of a base station apparatus.

FIG. 13 shows the structure of a baseband unit 500 of a base station apparatus.

To make a description simple, OFDMA will be taken as an example below. Other radio methods such as CDMA can also be used.

The baseband unit 500 shown in FIG. 13 corresponds to the baseband unit (BBU) 72 shown in FIG. 3. The baseband unit 500 includes a CPRI interface 501, a DSP (controller) 515, a network interface 516, and a memory 520, which are used both for transmission and receiving. The baseband unit 500 also includes, for receiving, a CP eliminator 502, an FFT section 503, a demultiplexer 504, a channel estimate section 505, a maximum likelihood detection (MLD) section 506, a decoder 507, and a control channel demodulator 508. The baseband unit 500 further includes, for transmission, a modulator 509, a reference signal generator 510, a multiplexer 511, an IFFT section 513, a CP adder 514, and a control channel modulator 519.

A receiving scheme where a signal received by a remote radio unit (radio unit) is demodulated will be described below first. The remote radio unit corresponds to the structure from a subsequent stage of the baseband unit shown in FIG. 3 to a stage prior to the antennas 95 and 96. The remote radio unit is, for example, a block for sending and receiving a radio signal through the antennas 95 and 96.

A data item sent from each remote radio unit is converted to an effective baseband signal by the CPRI interface 501. When a plurality of remote radio units send data items, they are converted sequentially to baseband signals. Then, the CP eliminator 502 eliminates the cyclic prefix (CP) from the baseband signal at appropriate timing. The FFT section 503 converts the baseband signal from which the CP has been eliminated to a frequency domain signal. The frequency domain signal is separated into function channel signals, such as a control channel signal, a user data channel (or shared channel) signal, and a reference signal, by the demultiplexer 504.

The demultiplexer 504 takes information for each terminal from the shared channel signal according to scheduler information and divides the information for each terminal into control information, user data information, reference signal information. The channel estimate section 505 uses the reference signal to estimate a propagation path through which the receiving signal has passed. The control channel demodulator 508 uses the result of propagation path estimation performed by the channel estimate section 505 to demodulate and decode the control channel signal. The result of decoding is sent to the DSP 515. The MLD section 506 uses the result of propagation path estimation and the user data channel signal for each remote radio unit to obtain the result of minimum mean square estimation (MMSE) for the received user data information. With the MMSE, pieces of information received by the plurality of remote radio units are appropriately combined. The logarithmic likelihood ratio (LLR) is calculated from the combined pieces of information. The LLR is sent to the decoder 507. User data decoding is performed by the decoder 507. The decoded user data is sent to the DSP 515, is subjected to upper layer processing such as decryption, and sent to the network through the network interface 516.

A transmission scheme will be described next. User data sent from the network is subjected to upper layer processing such as encryption in the DSP 515, and then is sent to the modulator 509. Error correction encoding (or transmission line encoding) such as turbo encoding is performed therein. Control information to be sent from each remote radio unit is generated by the DSP 515 and the control information is modulated by the control channel modulator 519. A cell specific reference signal and a terminal specific reference signal are generated by the reference signal generator 510. The generated reference signals, the encoded user data, and the modulated control information are assigned to frequency, time, and antenna resources by the multiplexer 511.

The IFFT section 513 converts information to be sent, which is performed a spatial signal processing from the frequency domain to the time domain. The CP adder 514 adds a CP as a multiple path measure. The signal to which a CP has been added is sent to a remote radio unit 600 through the CPRI interface 501 and is sent as a radio signal.

When the difference between the reception quality of a signal sent from the local base station apparatus and the reception quality of a signal sent from an adjacent base station apparatus adjacent to the local base station apparatus, both measured at the terminal 1, is smaller than a predetermined reference, the DSP 515 changes a mode in which both the antennas 95 and 96 are used to send the signal to the terminal to a mode in which one of the antennas 95 and 96 is used to send the signal to the terminal. According to the mode, the baseband unit 500 sends the signal to both or one of the transmitters Tx 82 and 83.

Figure 7:
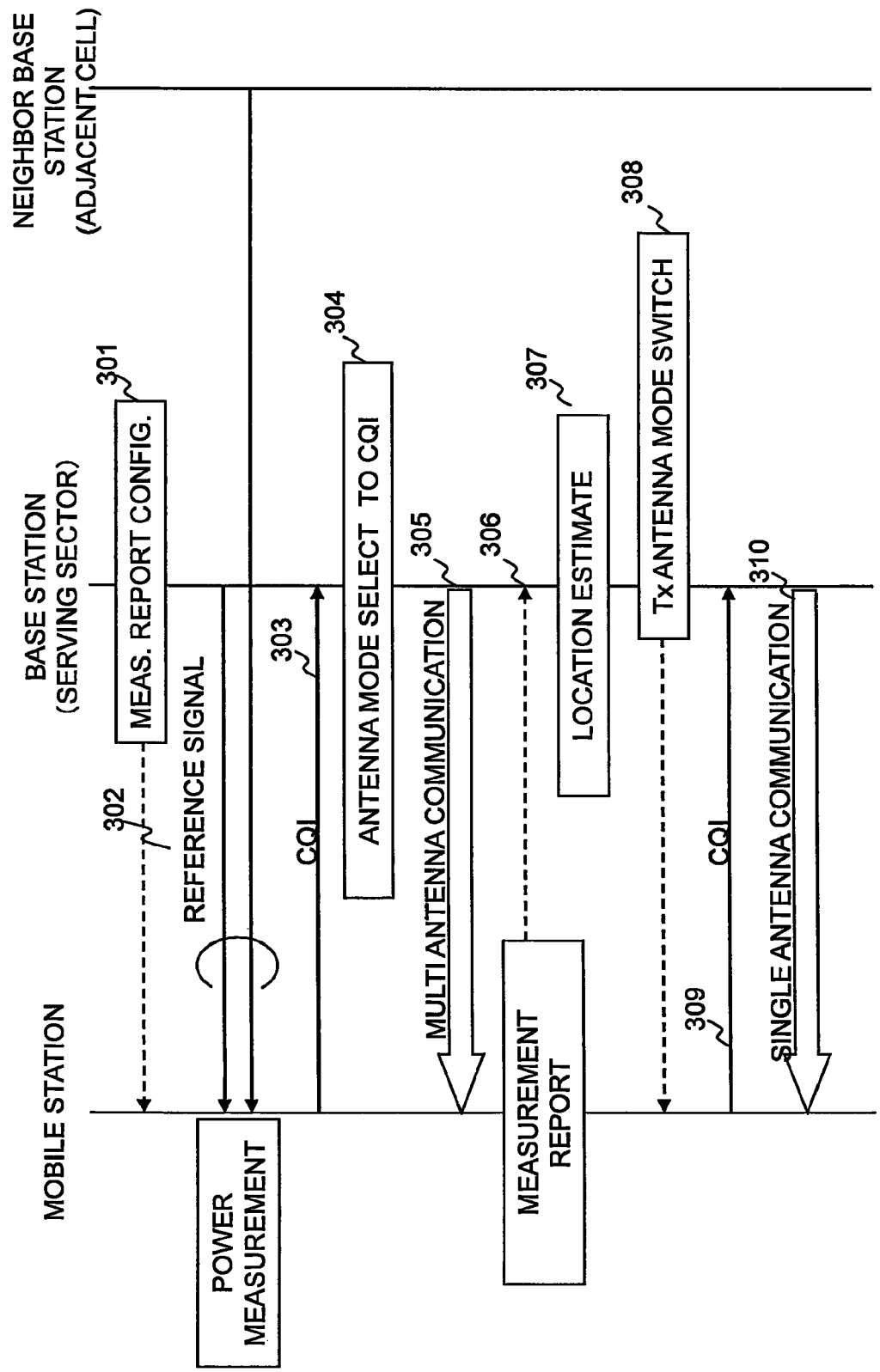
FIG. 7 is a sequence diagram showing an antenna mode switching procedure in one embodiment of the present invention.

FIG. 7 is a sequence diagram showing an antenna mode switching procedure.

A base station apparatus (for example, the DSP 515) sends a measurement request to a terminal (301). The measurement request demands of the terminal that the terminal measure the reception quality (for example, the receiving power) of a signal sent from the local base station apparatus and the reception quality of a signal sent from an adjacent base station apparatus adjacent to the local base station apparatus, and send a measurement report signal when the difference in reception quality is smaller than a predetermined reference. Other than the receiving power, an appropriate index indicating the reception quality of a signal, such as the signal-to-noise ratio (SNR), may be used as the reception quality.

Figure 9:
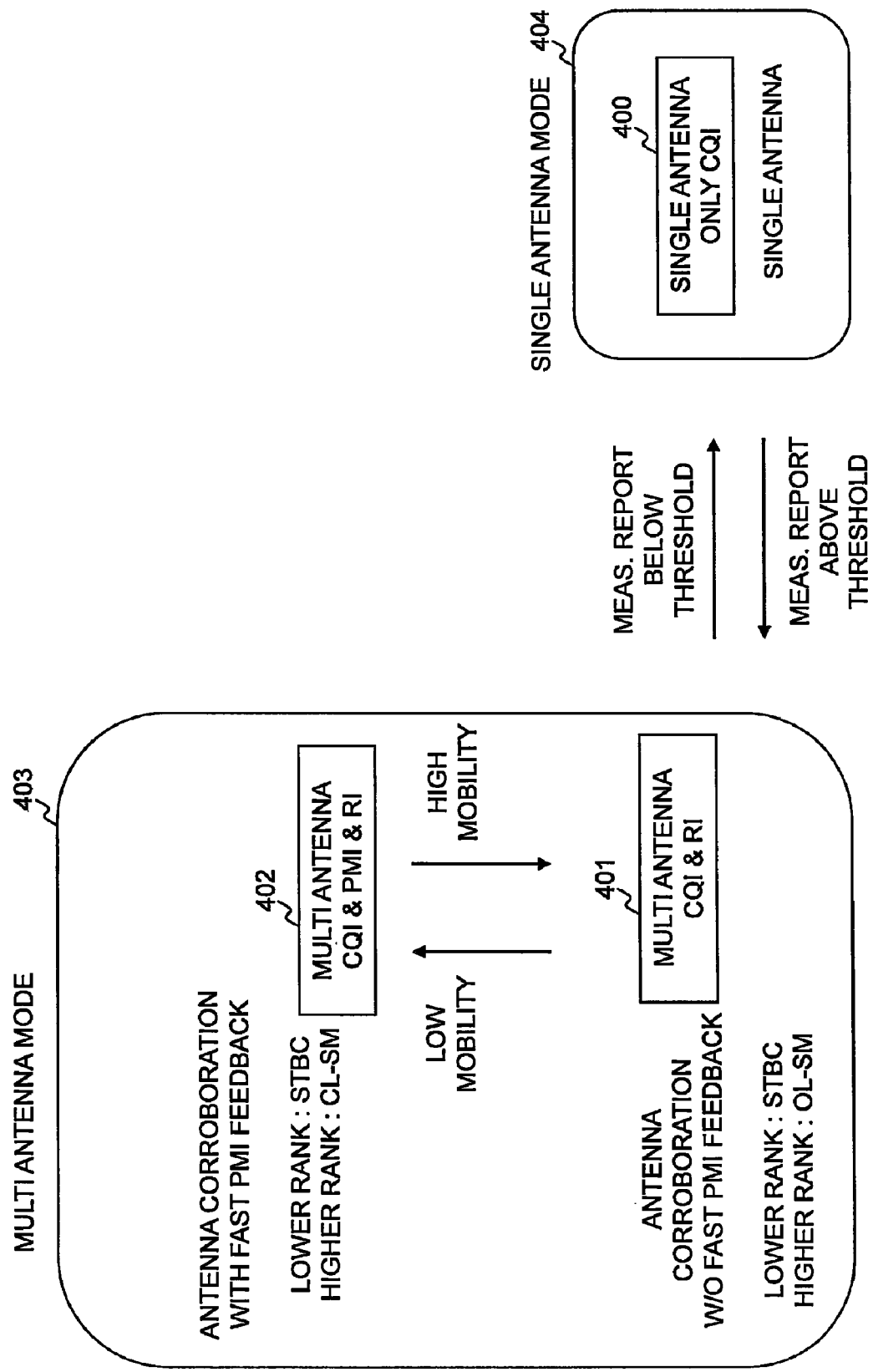
FIG. 9 is a state transition diagram in the antenna mode switching procedure.

When the terminal receives the measurement request (301), the terminal measures the reception quality of a reference signal sent from the local base station apparatus (serving sector), which sent the measurement request, and the reception quality of a reference signal sent from an adjacent base station apparatus (a neighbor base station in an adjacent cell) adjacent to the local base station apparatus (302). Then, the terminal sends a propagation status report, or a channel quality indicator (CQI), to the local base station apparatus (303). The base station apparatus selects the antenna mode according to the received CQI (304). For example, temporal fluctuation in reception quality is determined according to the received CQI, and either an antenna mode 401 or 402, to be described later with reference to FIG. 9, is selected. Here, the base station apparatus sends a signal to the terminal with two antennas according to the selected mode (305).

When the difference between the reception quality of a signal sent from the local base station apparatus and the reception quality of a signal sent from the adjacent base station apparatus is smaller than the predetermined reference ($Th_{sw}$), the terminal sends a measurement report signal to the local base station apparatus. The measurement report signal may include, for example, the reception quality of the signal sent from the local base station apparatus and the reception quality of the signal sent from the adjacent base station apparatus.

Figure 8:
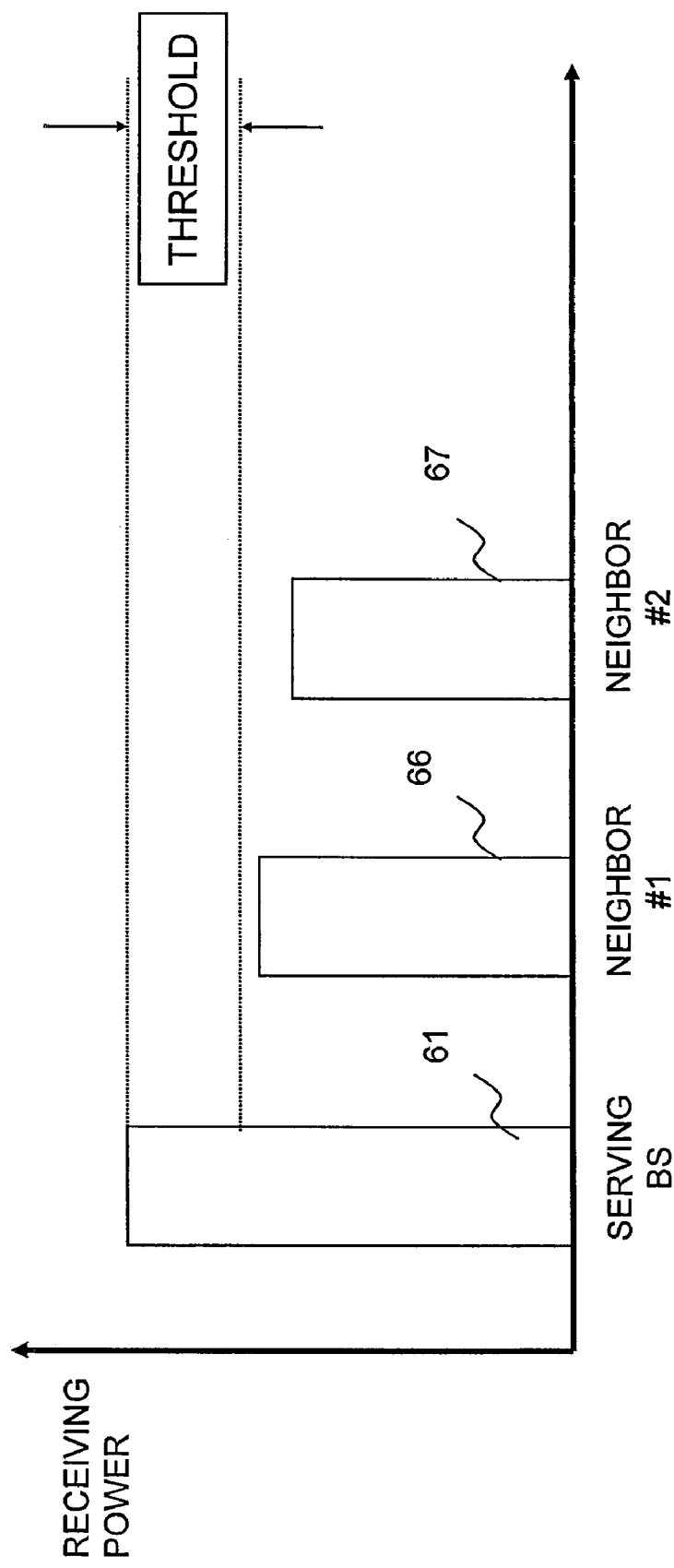
FIG. 8 is a view showing an antenna mode switching condition (threshold).

With reference to FIG. 8, an antenna mode switching condition (threshold) will be described below. The terminal measures the receiving power 61 of a signal sent from the local base station apparatus and the receiving power 66 and 67 of signals sent from adjacent base station apparatuses, as instructed by the local base station apparatus. When the terminal is located away from the boundaries of the local base station apparatus and the adjacent base station apparatuses, the difference in receiving power is larger than the threshold. When the terminal is located close to one of the boundaries, the difference in receiving power is small. If the difference is smaller than the threshold, the terminal sends a measurement report signal.

Back to FIG. 7, the operation description will be made again. The local base station apparatus estimates the position of the terminal according to the measurement report signal (307). For example, the base station apparatus determines (estimates the position of the terminal) whether the terminal is located close to the cell center or to one of the boundaries according to the report signal received in 306.

The base station apparatus changes a mode (second mode) in which transmission is performed with two antennas to a mode (first mode) in which transmission is performed with one antenna, according to the measurement report signal (308). The terminal also recognizes the switching of the antenna mode. The transmission power from the antenna is set in the base station apparatus 20 such that the SNR at the terminal is the same as that obtained when the two antennas are used for transmission. The base station apparatus may specify the transmission power in the first mode such that the difference between the SNR at the terminal in the second mode and that in the first mode is within a predetermined range.

The terminal sends another CQI (309). Here, the base station apparatus sends a signal to the terminal with one antenna according to the selected mode (310).

In the above case, the terminal determines whether the difference in reception quality is equal to or larger than the threshold. The base station apparatus may determine it. For example, the base station apparatus requests the terminal to measure the reception quality of a signal sent from the base station apparatus and that of a signal sent from an adjacent base station apparatus adjacent to the base station apparatus and to send the results of measurement; and receiving the results of measurement, when the difference between the reception quality of the signal sent from the base station apparatus and that of the signal sent from the adjacent base station apparatus is smaller than the threshold, the base station apparatus changes the second mode to the first mode.

When it is determined that the terminal has moved from a cell boundary to the cell center, in the same way as described in FIG. 7 (for example, when the difference in reception quality is equal to or larger than the threshold), the first mode is changed to the second mode. For example, whether the difference in reception quality is smaller than the threshold needs to be changed to whether the difference in reception quality is equal to or larger than the threshold. When the difference in reception quality is equal to or larger than the threshold, the terminal may send a second measurement report signal to the base station apparatus.

FIG. 9 is a state transition diagram in the antenna mode switching procedure.

In the present embodiment, a single antenna mode (first mode) 404 in which one of the antennas 95 and 96 is used to transmit a signal to the terminal and a multiple antenna mode (second mode) 403 in which the two antennas 95 and 96 are used to transmit a signal to the terminal are switched. The switching condition will be described later with reference to FIG. 12.

The multiple antenna mode (second mode) 403 further includes two sub modes 401 and 402, and they are used depending on the terminal movement speed and channel quality temporal fluctuation.

In the sub mode 401, open loop processing is performed and the channel is used in a pseudo-random way on the frequency axis with cyclic delay diversity (CDD) for transmission. CDD is implemented when the multiplexer 511 inserts a rotation term depending on the frequency into a precoding matrix to be multiplied for each antenna. The open loop processing is employed when feedback on the precoding matrix from the terminal is not in time for cases such as when the terminal moves at a high speed. The base station apparatus monitors the movement speed of the terminal by the channel estimate section 505 for forwarding signals. When the movement speed is equal to or higher than a threshold, the sub mode 401 is selected.

In the sub mode 402, closed loop processing is performed. The terminal sends a precoding matrix indicator (PMI) in addition to a CQI and an inter-sector antenna precoder is set according to the PMI. The precoder, located in the multiplexer 511, multiplies the transmission signal by the specified precoding matrix for transmission. When it is recognized by the channel estimate section 505 for forwarding signals that the movement speed of the terminal is lower than the threshold, the closed loop processing is selected.

Figure 10:
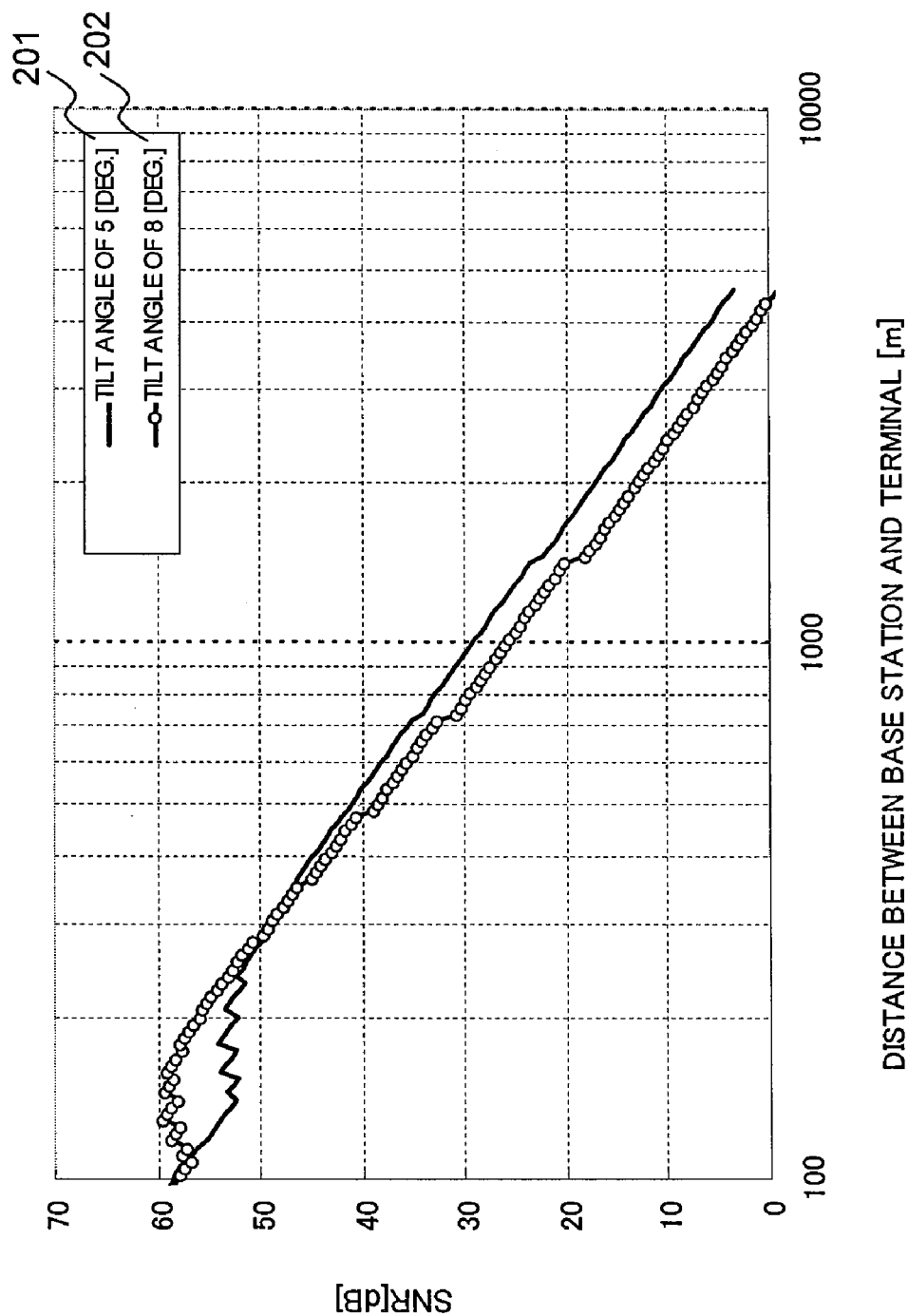
FIG. 10 is a view showing the relationship between the distance between the base station and a mobile terminal and the SNR at the position of the mobile terminal, for each tilt angle of the antenna.

FIG. 10 shows the relationship between the distance between the base station apparatus and the mobile terminal, and the SNR at the position of the mobile terminal, for each tilt angle of the antenna. FIG. 10 shows example curves 201 and 202 for tilt angles of 5 and 8 degrees, respectively. As the distance between the base station apparatus and the terminal becomes long, the difference in the SNR caused by the different tilt angles of the antenna becomes large.

Figure 11:
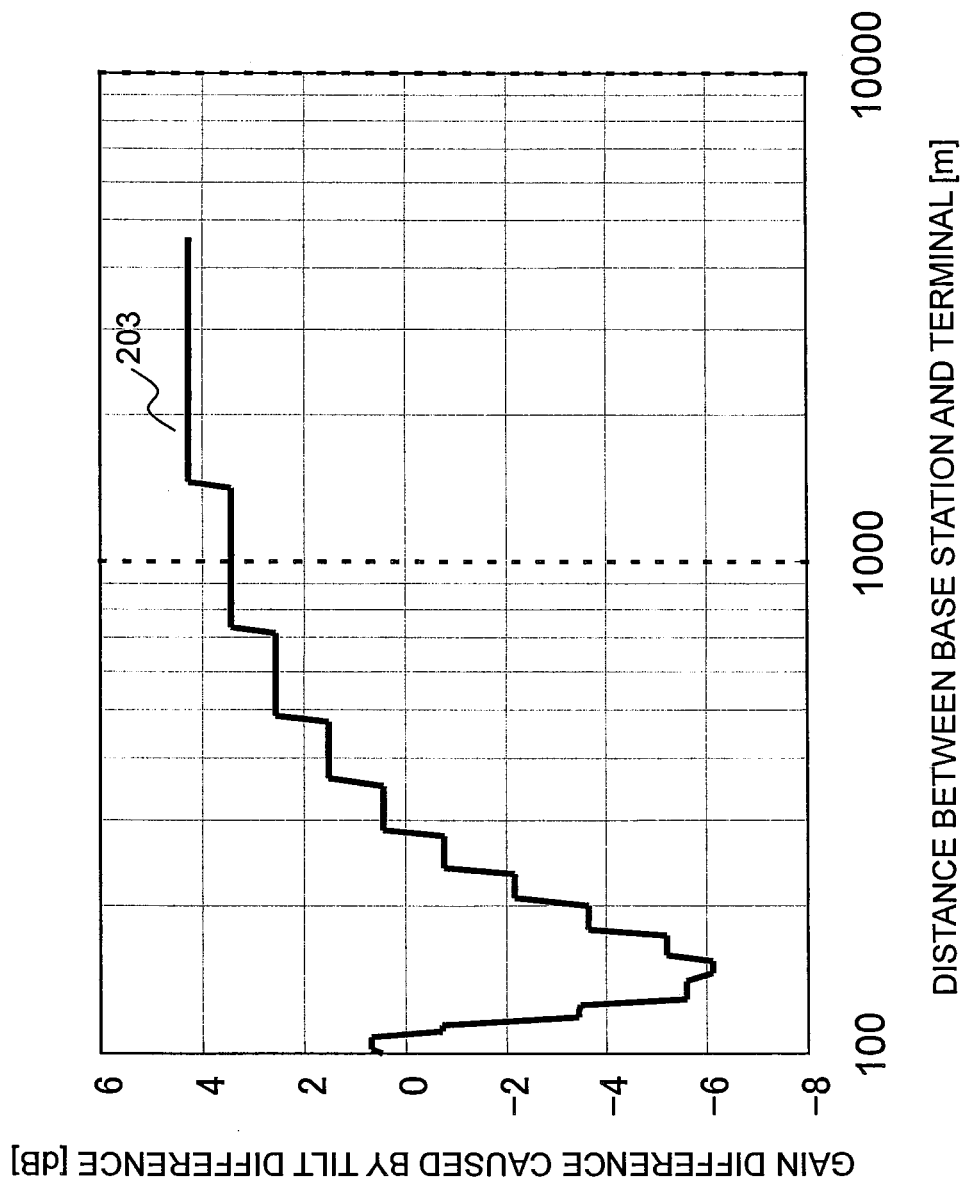
FIG. 11 is a graph showing a gain difference caused by a tilt angle difference.

FIG. 11 shows a gain difference caused by a tilt angle difference. FIG. 11 shows a difference in gain caused by the difference between tilt angles of 5 and 8 degrees, as in FIG. 10.

Figure 12:
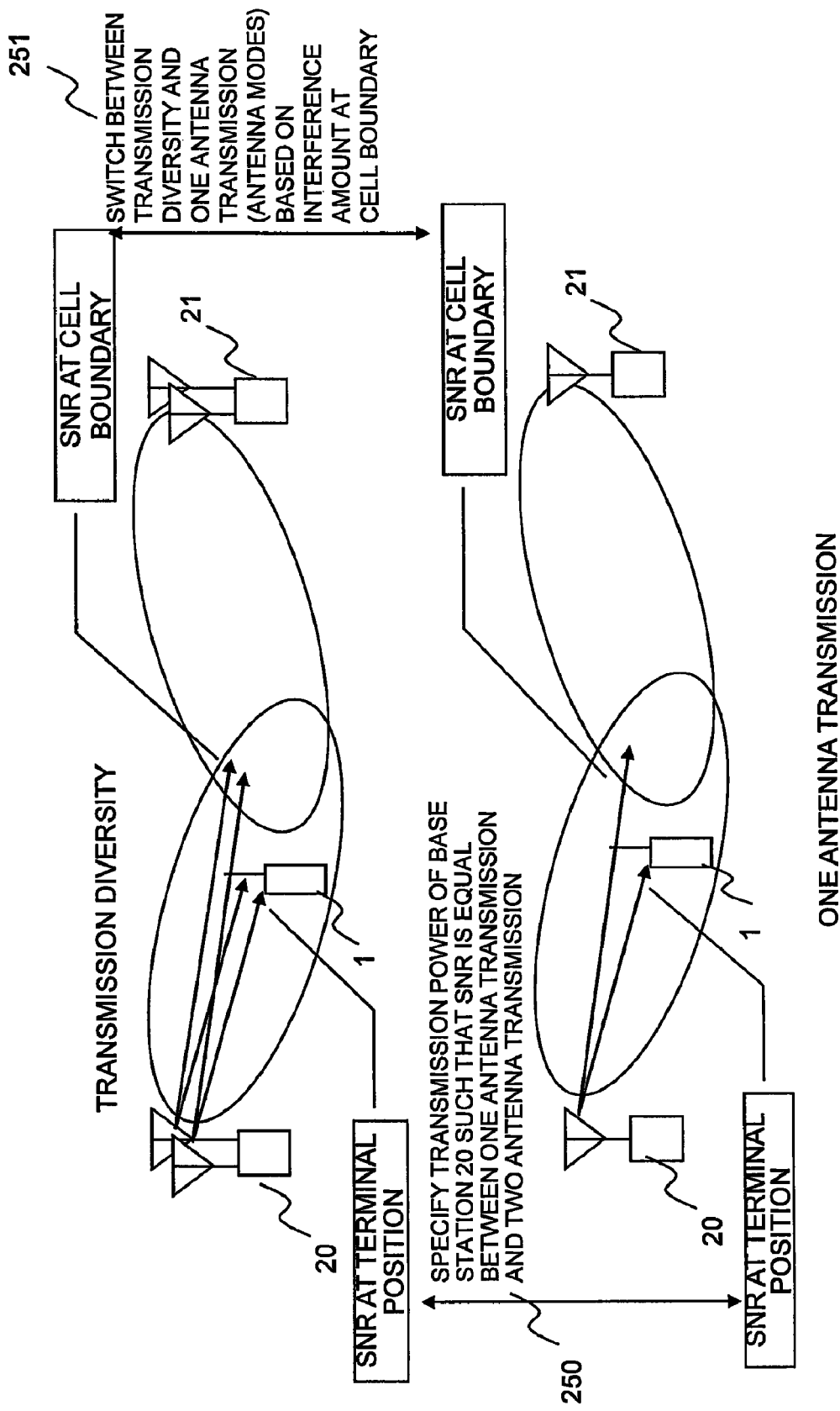
FIG. 12 is a view showing the antenna mode switching condition.

FIG. 12 shows the antenna mode switching condition.

As shown in FIG. 11, when the terminal 1 is distant from the base station apparatus 20, a gain difference caused by the tilt difference occurs. Even if a signal is sent to the terminal with two antennas, a transmission diversity gain is not obtained in some cases. In such a case, since the amount of interference becomes large at a cell boundary, the mode is changed to the one-antenna transmission mode (251). For example, in the one-antenna transmission mode, the transmission power from the base station apparatus 20 is specified such that the SNR at the terminal 1 is equal to that obtained when the two antennas are used for transmission (250), and a signal is sent with one antenna. In this state, the SNR at the terminal 1 is not changed from when the two antennas are used for transmission, and in addition, interference at the cell boundary is reduced, increasing the throughput of each terminal when viewed in the whole area.

Figure 14:
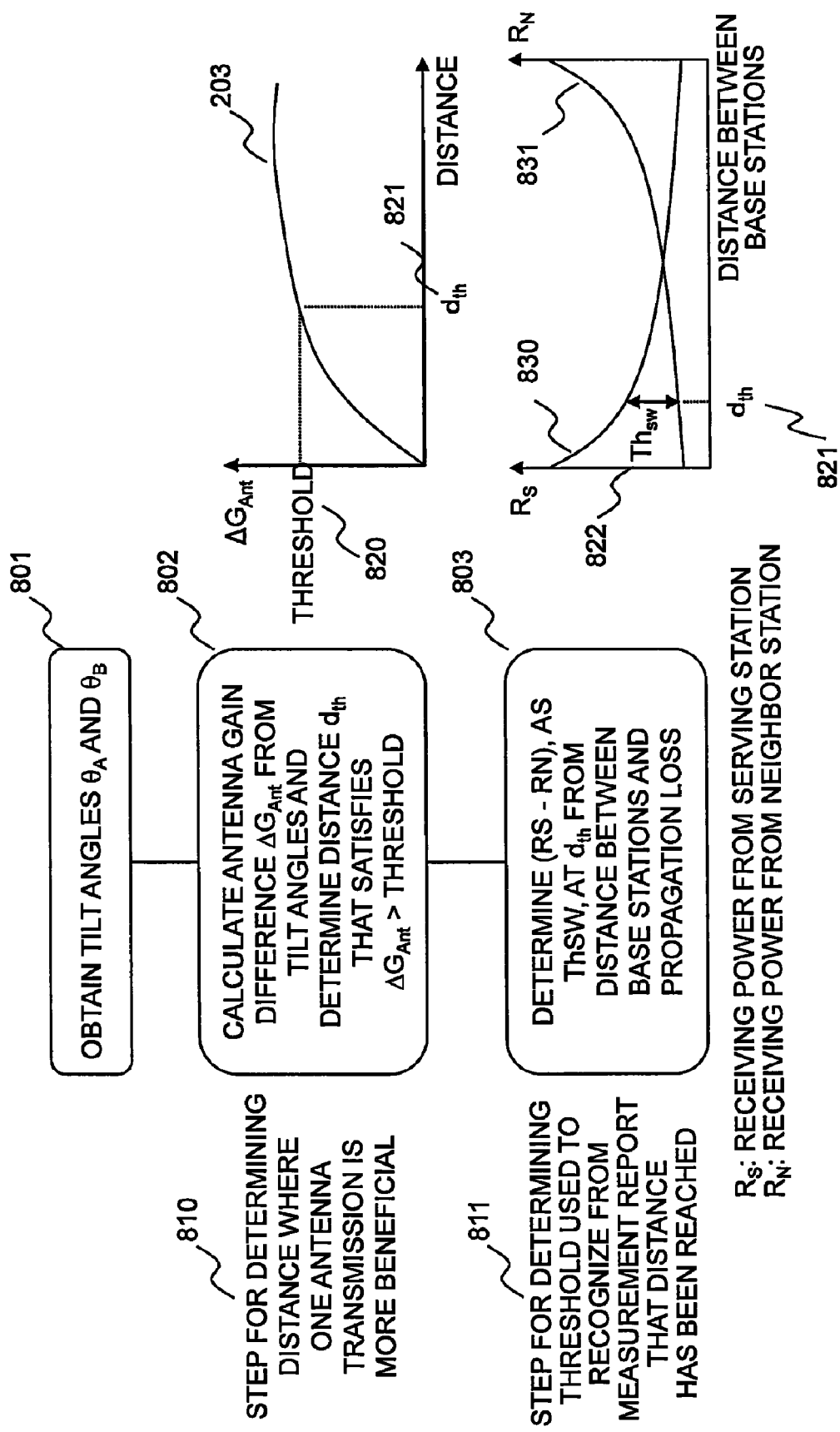
FIG. 14 is a flowchart for determining the antenna mode switching condition (threshold).

FIG. 14 is a flowchart of antenna mode switching.

The flowchart indicates an example case for determining an antenna switching condition (threshold).

The procedure shown in the flowchart is performed, for example, by the DSP 515 in each of the base station apparatuses 20, 21, and 22. A CPU, not shown, of the core apparatus (control apparatus) 50 may execute the procedure to send the obtained threshold to the base station apparatuses. In the following description, it is assumed that the DSP 515 of each base station apparatus executes the procedure. This procedure is started, for example, when the DSP 515 in each of the base station apparatuses 20, 21, and 22 or the CPU of the core apparatus 50 is started or when the tilt angles in the base station apparatuses 20, 21, and 22 are changed.

First, the DSP 515 obtains the tilt angles (801). The tilt angles are specified in advance in the base station apparatus.

The DSP 515 calculates the antenna gain difference $\Delta G_{Ant}$ from the tilt angles and determines a distance $d_{th}$ where $\Delta G_{Ant}$ becomes larger than a second predetermined threshold (802). This step determines the distance where one antenna transmission becomes more beneficial (810). As shown in FIG. 11, when two tilt angles are given, the relationship 203 between the distance between the base station apparatus and the terminal, and the antenna gain difference is obtained. With the use of the relationship 203, the distance $d_{th}$ 821 where $\Delta G_{Ant}$ becomes larger than the second predetermined threshold 820 is determined.

The DSP 515 determines the value of $(R_S - R_N)$ at the distance $d_{th}$ from the distance between base station apparatuses (distance between BSs) and a propagation loss and sets the value as a threshold $Th_{sw}$ 822. This step determines the threshold used to recognize from the measurement report signal (process 306 in FIG. 7) that the distance $d_{th}$ has been reached. This threshold $Th_{sw}$ corresponds to the threshold shown in FIG. 8. The threshold $Th_{sw}$ is included in the measurement request 301 and sent to the terminal. The distance between BSs and the propagation loss are known in advance, and the receiving power Rs 830 from the serving station and the receiving power $R_N$ 831 from a neighbor station, shown in FIG. 14, are also known in advance. The difference in receiving power, corresponding to the distance dth obtained in the process 802 is determined as the threshold $Th_{sw}$ 822.

Figure 15:
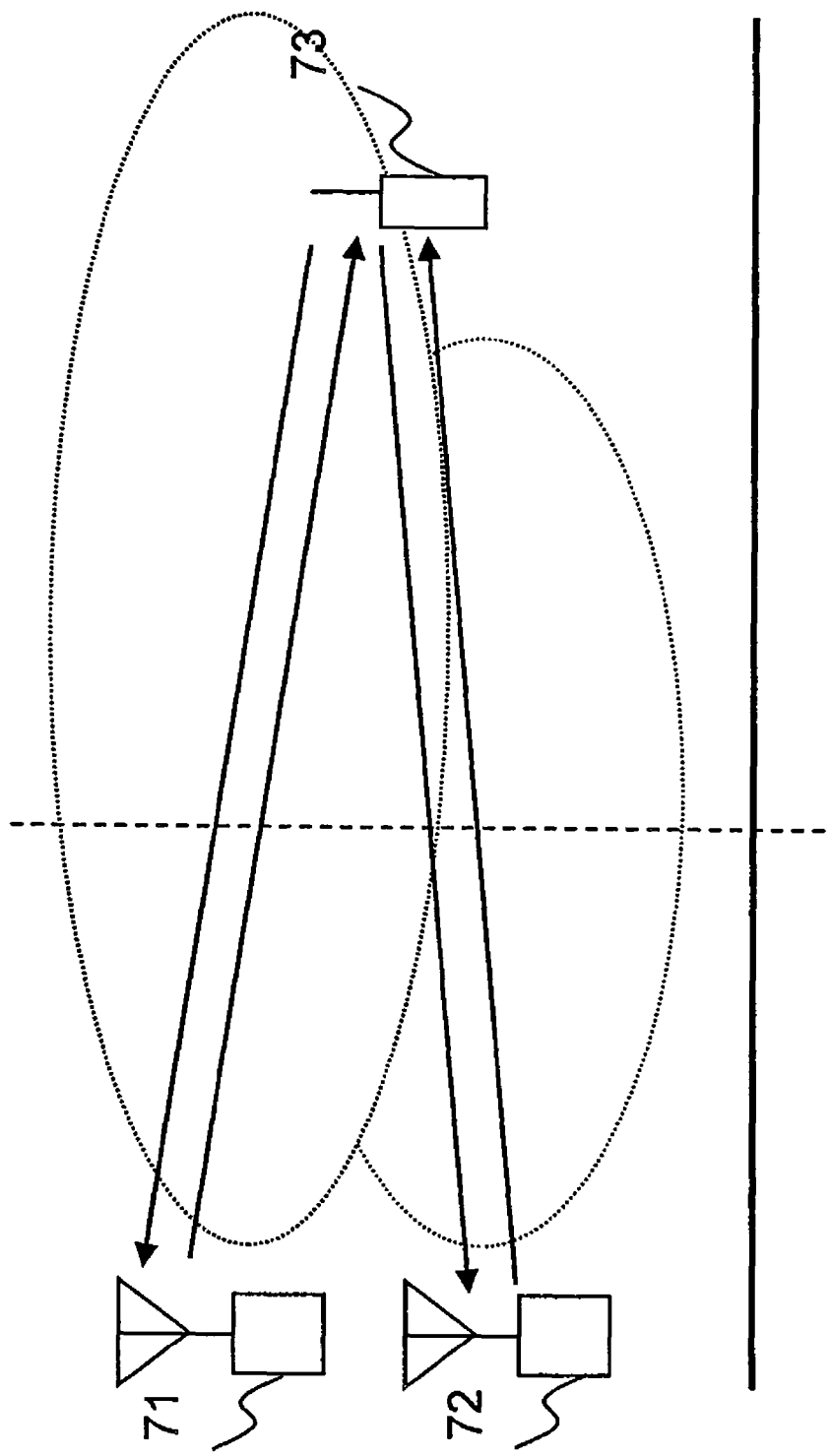
FIG. 15 is a view showing the difference in effective power between two antennas, caused by a tilt angle difference.

FIG. 15 shows the difference in effective power between two antennas of a base station apparatus, caused by the difference in tilt angle. When base station antennas 71 and 72 in FIG. 15 (corresponding to the antennas 95 and 96 in FIG. 3) send signals at a power of 10 W, for example, the power received by a mobile unit 73 (corresponding to the terminal 1) can be obtained by the following expression.

$$\text{Receive Power} = (\text{Ant1pwr} - \text{Propagation loss}) + (\text{Ant2pwr} - \text{Propagation loss} - \text{Ant\_Tilt loss}) \quad (1)$$

where "Receive Power" indicates the receiving power of the mobile unit 73, "Ant1pwr" indicates the transmission power of the antenna 71, "Propagation loss" indicates a propagation loss, "Ant2pwr" indicates the transmission power of the antenna 72, and "Ant_Tilt loss" indicates the difference in gain between the antennas 71 and 72 at the measurement length.

When the mobile unit 73 sends a signal at a power of 1 W, for example, and the antennas 71 and 72 at the base station apparatus receive the signal, the receiving power can be obtained by the following expressions.

$$\text{Ant71 Receive Power} = \text{Mob\_pwr} - \text{Propagation loss} \quad (2)$$

$$\text{Ant72 Receive Power} = \text{Mob\_pwr} - \text{Propagation loss} - \text{Ant\_Tilt loss} \quad (3)$$

where "Ant 71 Receive Power" indicates the receiving power of the antenna 71, "Mob_pwr" indicates the output power of the mobile unit 73, "Propagation loss" indicates a propagation loss, "Ant72 Receive Power" indicates the receiving power of the antenna 72, and "Ant_Tilt loss" indicates the difference in gain between the antennas 71 and 72 at the measurement length.

The difference Gap_ant in receiving power between the antennas 71 and 72 can be obtained by the following expression.

$$\text{Ant 71 Receive Power} - \text{Ant72 Receive Power} = \text{Gap\_ant} \quad (4)$$

In the example case shown in FIG. 14, the threshold $Th_{sw}$ is determined according to the gain difference in receiving power at the terminal. The threshold $Th_{sw}$ can also be determined according to the gain difference in receiving power between the antennas at the base station apparatus. For example, when the antenna gain difference (Expression (4)) between the two antennas 71 and 72 of the base station apparatus exceeds a predetermined threshold Th_gap_ant (for example, 3 dB, corresponding to the threshold 820 in FIG. 14), as shown in Expression (5), it is determined that the antenna mode should be switched.

$$\text{Gap\_ant} > \text{Th\_gap\_ant} \quad (5)$$

In the above case, switching may occur even when the terminal is close to the base station apparatus. Therefore, only when the terminal is located in the area 103 covered by the base station apparatus 20 in FIG. 6, switching is activated. Whether the terminal is located in the area 100 or in the area 103 can be determined with a known technology.

The present invention can be applied, for example, to radio communication systems employing FFR, such as LTE systems and WiMAX systems.

What is claimed is:

1. A base station apparatus comprising:
   a first antenna for emitting radio waves at a first tilt angle;
   a second antenna for emitting radio waves at a second tilt angle different from the first tilt angle;
   a radio unit for sending and receiving radio signals through the first and second antennas; and
   a baseband unit for sending and receiving signals to and from a terminal through the first antenna and/or the second antenna by switching between a first mode in which a signal is sent to the terminal with one of the first antenna and the second antenna and a second mode in which the signal is sent to the terminal with a plurality of antennas that include the first antenna and the second antenna;
   wherein the signal is sent in the first mode when a difference between reception quality of the signal sent from the base station apparatus and reception quality of the signal sent from an adjacent base station apparatus adjacent to the base station apparatus is smaller than a predetermined reference, each reception quality being measured at the terminal; and
   the signal is sent in the second mode when the difference between the reception quality of the signal sent from the base station apparatus and the reception quality of the signal sent from the adjacent base station apparatus adjacent to the base station apparatus is equal to or larger than the predetermined reference, each reception quality being measured by the terminal.

2. A base station apparatus according to claim 1, wherein the reception quality is receiving power sent from each base station apparatus and received at the terminal.

3. A base station apparatus according to claim 1, wherein the baseband unit receives a first measurement report signal sent from the terminal when the difference between the reception quality of the signal sent from the base station apparatus and the reception quality of the signal sent from the adjacent base station apparatus is smaller than the predetermined reference, the reception quality being at the terminal, and changes the second mode to the first mode according to the first measurement report signal, or the baseband unit receives a second measurement report signal sent from the terminal when the difference between the reception quality of the signal sent from the base station apparatus and the reception quality of the signal sent from the adjacent base station apparatus is equal to or larger than the predetermined reference, the reception quality being at the terminal, and changes the first mode to the second mode according to the second measurement report signal.

4. A base station apparatus according to claim 3, wherein the baseband unit requests the terminal to measure the reception quality of the signal sent from the base station apparatus and the reception quality of the signal sent from the adjacent base station apparatus and to send the first measurement report signal when the difference in the reception quality is smaller than the predetermined reference and the second measurement report signal when the difference in the reception quality is equal to or larger than the predetermined reference.

5. A base station apparatus according to claim 1,
wherein the baseband unit requests the terminal to measure the reception quality of the signal sent from the base station apparatus and the reception quality of the signal sent from the adjacent base station apparatus and to send the results of measurement;
wherein the baseband unit receives the results of measurement, and changes the second mode to the first mode when the difference between the reception quality of the signal sent from the base station apparatus and the reception quality of the signal sent from the adjacent base station apparatus, according to the results of measurement, is smaller than the predetermined reference; or
the baseband unit receives the results of measurement, and changes the first mode to the second mode when the difference between the reception quality of the signal sent from the base station apparatus and the reception quality of the signal sent from the adjacent base station apparatus, according to the results of measurement, is equal to or larger than the predetermined reference.

6. A base station apparatus according to claim 1, further comprising:
a second baseband unit for sending signals to the terminal with the first antenna at the first tilt angle; and
a third baseband unit for sending signals to the terminal with the second antenna at the second tilt angle.

7. A base station apparatus according to claim 1, wherein the second mode includes a MIMO mode in which different signals are sent to the terminal from the first and second antennas in an area where an FFR reuse carrier is assigned and a diversity mode in which identical signals are sent to the terminal from the first and second antennas in an area where an independent FFR carrier is assigned.

8. A base station apparatus according to claim 1, wherein the baseband unit specifies transmission power in the first mode such that the difference between an SNR measured at the terminal in the second mode and the SNR measured at the terminal in the first mode is within a predetermined range.

9. A base station apparatus according to claim 1, wherein the predetermined reference corresponds to a distance between the terminal and the base station apparatus where the gain difference in receiving power between signals received at the terminal from the first and second antennas exceeds or falls below a predetermined threshold.

10. A base station apparatus according to claim 1, wherein the predetermined reference corresponds to a distance between the terminal and the base station apparatus where the gain difference in receiving power between signals received at the first and second antennas from the terminal exceeds or falls below a predetermined threshold.

11. An interference reducing method for a base station apparatus that includes a first antenna for emitting radio waves at a first tilt angle and a second antenna for emitting radio waves at a second tilt angle different from the first tilt angle, the interference reducing method switching between a first mode in which a signal is sent to a terminal with one of the first antenna and the second antenna and a second mode in which the signal is sent to the terminal with a plurality of antennas that include the first antenna and the second antenna to reduce interference in a cell adjacent to the cell of the base station apparatus, the interference reducing method comprising the steps of:
requesting, by the base station apparatus, the terminal to measure reception quality of the signal sent from the base station apparatus and reception quality of the signal sent from an adjacent base station apparatus adjacent to the base station apparatus;
measuring, by the terminal, the reception quality of the signal sent from the base station apparatus and the reception quality of the signal sent from the adjacent base station apparatus;
when the difference between the reception quality of the signal sent from the base station apparatus and the reception quality of the signal sent from the adjacent base station apparatus is smaller than a predetermined reference, each reception quality being measured at the terminal, changing, by the base station apparatus operating in the second mode to transmit the signal, the second mode to the first mode; and
when the difference between the reception quality of the signal sent from the base station apparatus and the reception quality of the signal sent from the adjacent base station apparatus is equal to or larger than the predetermined reference, each reception quality being measured at the terminal, changing, by the base station apparatus operating in the first mode to transmit the signal, the first mode to the second mode.

* * * * *